United States Patent [19]

Kirchner

[11] 4,167,978
[45] Sep. 18, 1979

[54] FIELD CULTIVATOR

[76] Inventor: Harold A. Kirchner, 2507-17th Ave., S., Lethbridge, Canada

[21] Appl. No.: 850,638

[22] Filed: Nov. 11, 1977

[51] Int. Cl.² .............................................. A01B 61/04
[52] U.S. Cl. .................................... 172/310; 172/657; 172/660
[58] Field of Search ............... 172/261, 310, 311, 413, 172/614, 615, 619, 620, 634, 639, 657, 658, 659, 660

[56] References Cited

U.S. PATENT DOCUMENTS

| 517,215 | 3/1894 | Edge | 172/660 X |
|---|---|---|---|
| 3,266,579 | 8/1966 | Hofer | 172/657 X |
| 3,431,981 | 3/1969 | Hofer | 172/657 X |
| 3,460,631 | 8/1969 | Friesen et al. | 172/311 |
| 3,976,145 | 8/1976 | Blair | 172/615 |

FOREIGN PATENT DOCUMENTS

| 1016002 | 8/1977 | Canada | 172/657 |
|---|---|---|---|
| 181360 | 11/1962 | Sweden | 172/657 |

*Primary Examiner*—Richard T. Stouffer
*Attorney, Agent, or Firm*—Stanley G. Ade

[57] ABSTRACT

Four or more cultivator arms or shanks are pivoted to the front and rear of a main frame and are interconnected by linkage so that if a cultivator blade on one arm strikes an obstruction, then it moves rearwardly to clear same and at the same time the others that are interconnected, move forwardly by a lesser amount thus absorbing the movement of the cultivator blade striking the obstruction. When the obstruction is passed, the engagement of the remaining blades with the ground, returns them to the original position thus returning the tripped blade to the original position.

15 Claims, 6 Drawing Figures

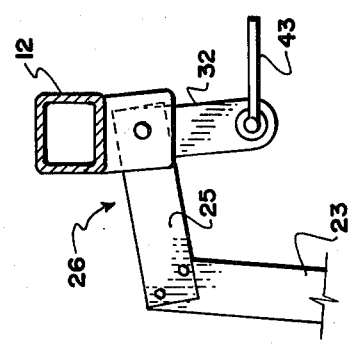
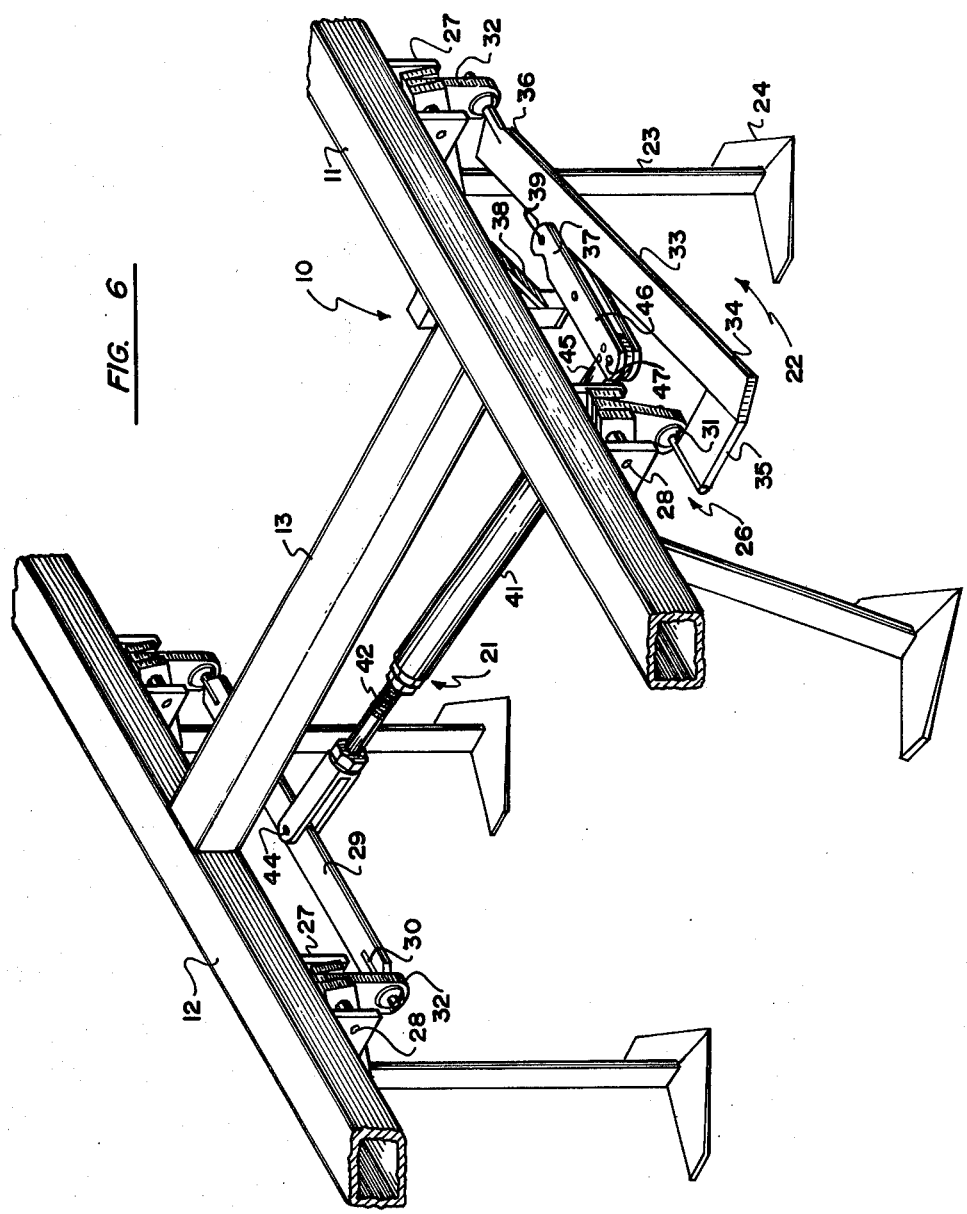

FIELD CULTIVATOR

BACKGROUND OF THE INVENTION

This invention relates to new and useful improvements to field cultivators.

Conventional cultivators utilize spring or hydraulically loaded mountings so that if one cultivator blade strikes an obstruction such as a rock or the like, during operation, it trips rearwardly to clear the obstruction whereupon the springs or hydraulic assemblies, return this particular cultivator blade to its original position.

Unfortunately such devices are difficult to control insofar as the pitch and depth of the cultivator sweeps are concerned. This is particularly so when ground of varying densities is being cultivated.

SUMMARY OF THE INVENTION

The present invention overcomes these disadvantages by interconnecting a plurality of front and rear cultivator shank assemblies together in such a way that if one strikes an obstruction, it moves rearwardly to clear same and at the same time moves the remainder of the set of cultivator assemblies forwardly so that they absorb the movement of the tripping cultivator assembly. When the obstacle is passed, the engagement of the remaining cultivator assemblies with the ground, forces them to the original position which at the same time, due to the interconnecting linkage returns the original one to the preset condition.

The linkage system, eliminates the use of springs but provides trip action of the shanks to clear rocks and other hard objects.

One aspect of the invention is therefore to provide a cultivator of the character herewithin described comprising in combination a frame, ground engaging wheels mounted on said frame to support same, a plurality of sets of cultivator shank assemblies pivotally mounted by one end thereof to said frame adjacent the front and rear thereof, a cultivator tool on the lower ends of said shank assemblies, and linkage means interconnecting the shank assemblies of each set together whereby if at least one of said shank assemblies moves rearwardly relative to said frame, the other shank assemblies of the same set move forwardly, the total distance moved forwardly of said other shank assemblies of said set being substantially equal to the distance moved rearwardly by said one shank assembly of said set.

Another object of the invention is to provide a device of the character herewithin described which can be utilized with a fixed frame, or alternatively, can be extended in width by connecting various solid frame sections together, adding extension kits bolted to either end of the solid frames or, if desired, adding fold-up wing sections which can be attached to either end of the solid frame.

A yet further object of the invention is to provide a device of the character herewithin described, which can, if desired, be pulled from one end for transport purposes thus enabling a relatively wide machine to be transported readily and easily.

A still further object of the invention is to provide a device of the character herewithin described which may include means to adjust, within limits, the tilt to the sweeps attached to the shanks.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 5 is a view at right angles to FIG. 4.

FIG. 6 is a fragmentary isometric view of part of the frame showing one set of shank assemblies.

In the drawings like characters of reference indicate corresponding parts in the different figures.

DETAILED DESCRIPTION

Figure 1:
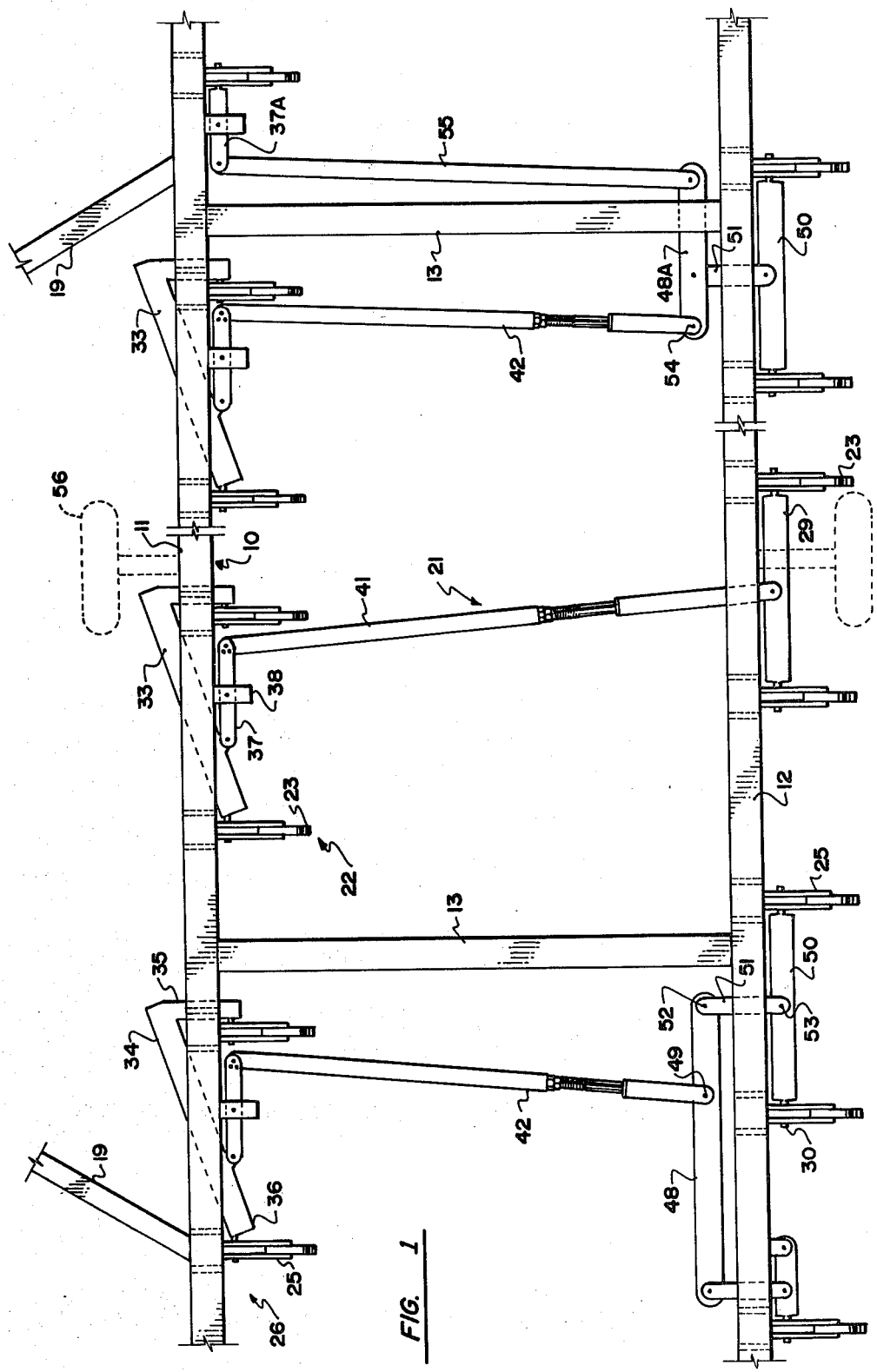
FIG. 1 is a top plan view of part of the cultivator.

Proceeding therefore to describe the invention in detail, reference character 10 illustrates a substantially rectangular frame including front longitudinal chassis members 11, rear longitudinal chassis members 12 and cross chassis members 13.

Although only one such section is shown, nevertheless it will be appreciated that this section can be of varying widths and can, if desired, be bolted to adjacent similar sections if desired.

Also, folding wings sections can be provided but as such wing sections are conventional, it is not believed necessary to describe same further.

Figure 3:
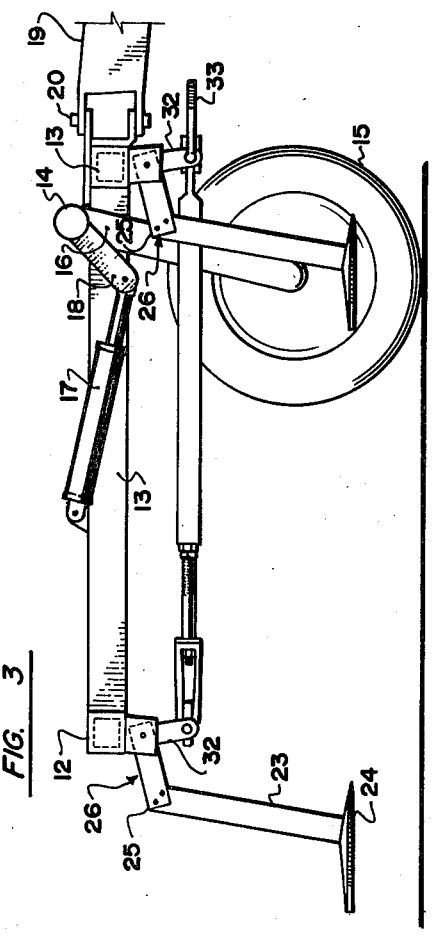
FIG. 3 is a side elevation of FIG. 1.
Figure 4:
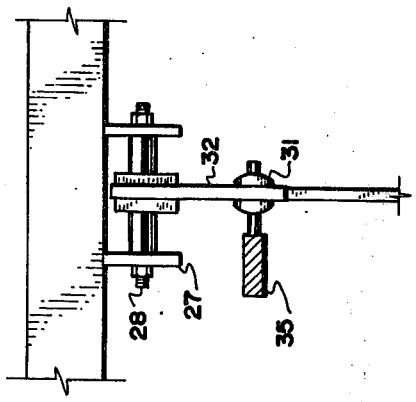
FIG. 4 is a fragmentary partially sectioned view of one of the hinge connections to the frame.

A rock shaft 14 is mounted for rotation to the chassis adjacent the front side 11 thereof and ground engaging wheels 15, mounted upon axle struts 16, are supported upon the rock shaft and support the frame above the ground as clearly shown in FIG. 3.

A fluid operator 17 is mounted on the frame cross member 13 and is operatively connected to a link 18 which in turn connects to the rock shaft 14 so that extension and retraction of the fluid operator 17, lowers or raises the frame 10 relative to the wheels 15 thus controlling the depth of penetration of the shank assemblies in the usual manner.

A forwardly extending hitch 19 is pivotally connected to the front member 11 of the chassis by means of pivot pins 20 and the hitch 19 extends to a source of power in the form of a tractor (not illustrated) in the usual way.

Sets of cultivator assemblies are provided and are mounted in the frame, one such set being indicated collectively by reference character 21.

Each set may consist of four or more individual cultivator assemblies collectively designated 22 interconnected together by linkage as will hereinafter be described.

Each cultivator assembly includes a cultivator shank 23 having a cultivating tool such as a blade 24 mounted upon the lower end thereof. Alternatively, the cultivator shank may take the form of a spring shank with a ripper shank tool on the lower end thereof (not illustrated). Each shank 23 is secured by the upper end thereof to one end 25 of a crank arm collectively designated 26 pivoted intermediate the ends thereof between a pair of lugs 27 extending downwardly from the longitudinal frame members 11 or 12, reference character 28 illustrating the pivotal connection of the crank arms to the lugs 27.

A rear connector 29 taking the form of a plate, is provided with pivot pins 30 extending from each end thereof which in turn engage spherical bearings 31 secured to the other legs or arms 32 of the crank arm 26 of an adjacent pair of cultivator assemblies.

A front connector 33 connects adjacent pairs of front cultivator assemblies together. The front cultivator assemblies also include crank arms 26 mounted between lugs 27 similar to the mounting of the rear assemblies.

The front connector includes a flat bar 34 with an offset portion 35 at one end thereof carrying a pivot pin 30A. A corresponding pivot pin 30A is secured to and extends from the other end 36 of the flat bar or plate 34 as clearly shown in FIG. 2 and these pivot pins 30A engage these spherical bearings 31 of adjacent front cultivator assemblies.

A rocking link 37 is pivoted intermediate the ends thereof to a fixed support 38 extending below the front chassis member 11 and the front connector 33 is pivoted intermediate the ends thereof to one end of this rocking link 37 by means of a pivot pin 39 engaging through said one end and a lug 40 extending from one side of the plate 34.

A connector link 41 is provided with lengthwise adjustment 42 within the length thereof and is pivotally connected by the rear end 43 thereof to intermediate the ends of the rear connector link 29 by means of pivot pin 44.

The front 45 of the adjustable connector link 41 is pivotally connected to the other end 46 of the rocking link 37 and in this connection a plurality of apertures are formed in the end 46 anyone of which may be used to connect the adjustable connector link 41 by means of a pivot pin connection 47.

In operation, the set of shank assemblies are connected together and the cultivating tools 24 are let into the ground by raising the wheels 15 by means of the fluid operator 17 thus enabling the weight of the frame to force the tools into the ground the desired amount.

The implement is then moved forwardly by the associated tractor (not illustrated) and the sweeps or cultivating tools begin to cut through the ground at a depth desired and preset by the operator.

If one of the cultivating tools engages an obstruction such as a rock or root, resistance is met thus causing it to pivot rearwardly around the pivot 28 until it has been raised high enough to clear the obstruction. Assuming that one of the front cultivator assemblies engages an obstruction, then rearward movement of this particular cultivator assembly will cause the other front cultivator assembly to move forwardly due to the pivotal action of the front connector 33. At the same time the connection of this front connector 33 with the rocking link 37, will cause the rocking link to pivot around its pivot point thus moving the adjustable connector link 41 forwardly together with the two cultivator assemblies operatively connected thereto at the rear.

Figure 2:
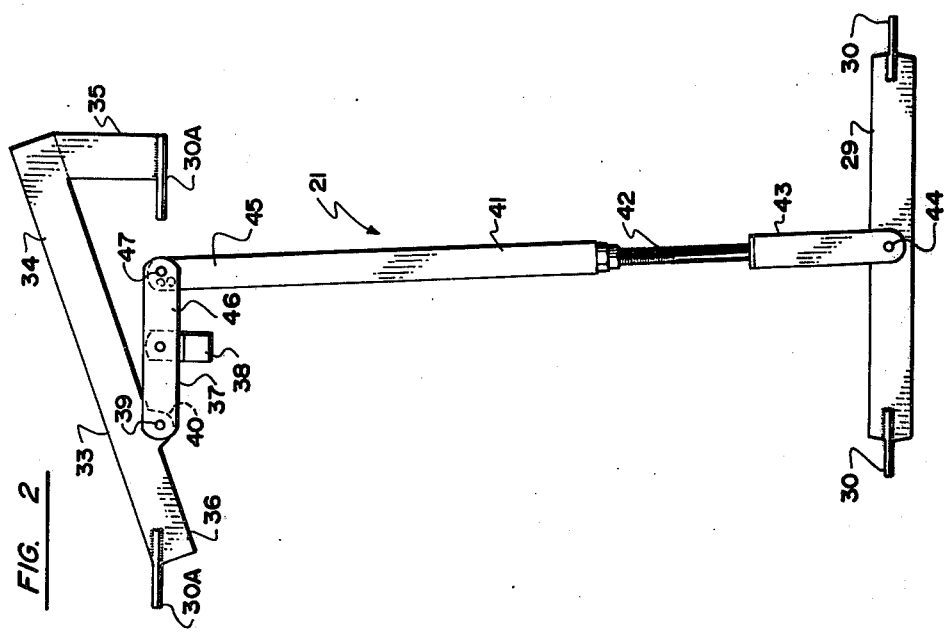
FIG. 2 is a fragmentary plan view of the interconnected linkage per se.

In an instance in which four shank assemblies 23 are connected together as in FIG. 2, the various linkage and angles are such that the sum of the movement of the other front cultivator assembly and the two rear cultivator assemblies is substantially equal to the distance moved by the front cultivator assembly striking the obstruction. This means that the movement is relatively slight and does not particularly interfere with the attitude of the cultivating tools 24. As soon as the obstruction is passed, the engagement of the three cultivator tools with the ground, forces them to move back to the original position and the linkage connection between the cultivator assemblies forces the other cultivator assembly back to its original position also. In other words the other cultivator assemblies attached to the one striking the obstruction, absorbs the movement of the one cultivator assembly which trips rearwardly to clear the obstruction. The interconnecting linkage eliminates the necessity for springs and hydraulic cylinders and the like and creates very little disturbance in the cultivating action.

The lengthwise adjustment of the adjustable connecting link 41 together with the positioning of the front end thereof in one of the plurality of apertures in the rocking link 37, give the necessary adjustments depending upon circumstances and conditions. For example if a rod weeder (not illustrated) is attached behind rear shanks as is common practise, then this can be compensated for by the necessary adjustment at point 47. The difference in leverage determined by the adjustment in the outward end of the rocking link 27, where it connects to the adjustable connector link 41, at point 47, is also used to balance the difference in pressure normally found between the front and rear shanks. Also changing this length of the link 41 gives the desired tilt to the sweeps on the shanks.

If two cultivator assemblies strike an object and move rearwardly together, the other two will also move forwardly always sharing the load and going back to equilibrium after the object has been passed.

Although four shanks have been described and illustrated, other forms of interconnection may be made as illustrated in the left and righthand sides of FIG. 1.

On the lefthand side of FIG. 1, five shank assemblies are shown connected together, two at the front and three at the rear. In this connection, the rear end 42 of the ajustable connector link 41 is connected to a balance bar 48 by means of pivot pin 49 and this balance bar is in turn connected to the rear connectors 50 by means of link 51 and pivot points 52 and 53.

On the righthand side of FIG. 1, five shank assemblies are shown with two at the rear and three at the front. Under these conditions, the rear end of the adjustable connector 42 is pivotally connected to a balance bar 48A by means of pivot 54 with a link 51 extending to the rear connector 50 as clearly shown.

A further connector link 55 is pivotally connected to the other end of the balance bar 48A and extends forwardly to a rocking link 37A which in turn is connected to the fifth cultivator assembly as clearly illustrated.

If it is desired to transport the cultivator endwise, transport wheel assemblies 56 may be secured to the chassis upon either side thereof and an end hitch (not illustrated) is provided in the usual manner.

However this does not affect the operation of the cultivator in the field in which the interconnected set of cultivator assemblies enables the load of an obstruction to be shared among a plurality of shank assemblies.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in limiting sense.

What I claim as my invention:

1. A cultivator comprising in combination a frame, ground engaging wheels mounted on said frame to support same, a plurality of sets of cultivator shank assemblies pivotally mounted by one end thereof to said frame adjacent the front and rear thereof, a cultivator tool on the lower ends of said shank assemblies, linkage means interconnecting the shank assemblies of each set together whereby if at least one of said shank assemblies of one of said sets, moves rearwardly relative to said frame, the other shank assemblies of the same set move forwardly, the total distance moved forwardly of said other shank assemblies of said set being substantially equal to the distance moved rearwardly by said one shank assembly of said set, said linkage means including a front connector pivotally connecting an adjacent pair of front shank assemblies together, a rear connector pivotally connecting adjacent pairs of rear shank assemblies together, and an adjustable connector link extending between and being operatively connected to said front and rear connectors, a rocking link pivotally mounted to said frame between the ends of said rocking link, said front connector being pivotally mounted between the ends thereof to one end of said rocking link, said adjustable connector link being pivotally mounted by one end thereof to the other end of said rocking link.

2. The cultivator according to claim 1 in which said adjustable connector link is pivotally connected by the other end thereof to intermediate the ends of said rear connector.

3. The cultivator according to claim 2 which includes means to adjust the depth of penetration of said cultivator tools with the ground, said means including means to adjust the height relationship between said frame and said ground engaging wheels, said last mentioned means including a rock shaft mounted for rotation in said frame, said wheels being operatively connected to said rock shaft, and fluid operator connected between said frame and said rock shaft to partially rotate said rock shaft.

4. The cultivator according to claim 3 in which said adjustable connector link is pivotally connected by the other end thereof to intermediate the ends of said rear connector.

5. The cultivator according to claim 1 in which each of said shank assemblies includes a crank arm, means pivotally mounting said crank arm to said frame intermediate the ends of said crank arm, a cultivator shank being secured by one end thereof to one end of said crank arm, said front connector being pivotally connected to the other end of said crank arms of said front shank assemblies, said rear connector link being pivotally connected to the other ends of said crank arms of said rear shank assemblies.

6. The cultivator according to claim 5 which includes means to adjust the depth of penetration of said cultivator tools with the ground, said means including means to adjust the height relationship between said frame and said ground engaging wheels, said last mentioned means including a rock shaft mounted for rotation in said frame, said wheels being operatively connected to said rock shaft, and fluid operator connected between said frame and said rock shaft to partially rotate said rock shaft.

7. The cultivator according to claim 6 in which said adjustable connector link is pivotally connected by the other end thereof to intermediate the ends of said rear connector.

8. The cultivator according to claim 5 in which said adjustable connector link is pivotally connected by the other end thereof to intermediate the ends of said rear connector.

9. The cultivator according to claim 1 which includes means to adjust the depth of penetration of said cultivator tools with the ground, said means including means to adjust the height relationship between said frame and said ground engaging wheels, said last mentioned means including a rock shaft mounted for rotation in said frame, said wheels being operatively connected to said rock shaft, and fluid operator connected between said frame and said rock shaft to partially rotate said rock shaft.

10. The cultivator according to claim 9 in which said adjustable connector link is pivotally connected by the other end thereof to intermediate the ends of said rear connector.

11. A cultivator comprising in combination a frame, ground engaging wheels mounted on said frame to support same, a plurality of sets of cultivator shank assemblies pivotally mounted by one end thereof to said frame adjacent the front and rear thereof, a cultivator tool on the lower ends of said shank assemblies, linkage means interconnecting the shank assemblies of each set together whereby if at least one of said shank assemblies of one of said sets, moves rearwardly relative to said frame, the other shank assemblies of the same set move forwardly, the total distance moved forwardly of said other shank assemblies of said set being substantially equal to the distance moved rearwardly by said one shank assembly of said set, said linkage means including a front connector pivotally connecting an adjacent pair of front shank assemblies together, a rear connector pivotally connecting adjacent pairs of rear shank assemblies together, and an adjustable connector link extending between and being operatively connected to said front and rear connectors, each of said shank asssemblies including a crank arm, means pivotally mounting said crank arm to said frame intermediate the ends of said crank arm, a cultivator shank being secured by one end thereof to one end of said crank arm, said front connector being pivotally connected to the other end of said crank arms of said front shank assemblies, said rear connector link being pivotally connected to the other ends of said crank arms of said rear shank assemblies.

12. The cultivator according to claim 11 in which said adjustable connector link is pivotally connected by the other end thereof to intermediate the ends of said rear connector.

13. The cultivator according to claim 11 which includes a rocking link pivotally mounted to said frame intermediate the ends of said rocking link, said front connector being pivotally mounted intermediate the ends thereof to one end of said rocking link, said adjustable connector link being pivotally mounted by one end thereof to the other end of said rocking link.

14. The cultivator according to claim 11 which includes means to adjust the depth of penetration of said cultivator tools with the ground, said means including means to adjust the height relationship between said frame and said ground engaging wheels, said last mentioned means including a rock shaft mounted for rotation in said frame, said wheels being operatively connected to said rock shaft, and fluid operator connected between said frame and said rock shaft to partially rotate said rock shaft.

15. The cultivator according to claim 14 in which said adjustable connector link is pivotally connected by the other end thereof to intermediate the ends of said rear connector.

* * * * *